United States Patent
Ozawa et al.

(10) Patent No.: US 10,265,886 B2
(45) Date of Patent: *Apr. 23, 2019

(54) METHOD OF MANUFACTURING MOLDING MATERIAL, MOLDING DIE FOR USE IN THE MANUFACTURING METHOD, AND METHOD OF MANUFACTURING RESIN ROTATOR

(71) Applicant: Shin-Kobe Electric Machinery Co., Ltd., Tokyo (JP)

(72) Inventors: Masaya Ozawa, Tokyo (JP); Masao Sugiyama, Tokyo (JP); Takeshi Fukao, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 430 days.

This patent is subject to a terminal disclaimer.

(21) Appl. No.: 14/901,756

(22) PCT Filed: Jul. 10, 2013

(86) PCT No.: PCT/JP2013/068877
§ 371 (c)(1),
(2) Date: Dec. 29, 2015

(87) PCT Pub. No.: WO2015/004752
PCT Pub. Date: Jan. 15, 2015

(65) Prior Publication Data
US 2016/0200004 A1    Jul. 14, 2016

(51) Int. Cl.
*B29B 15/08* (2006.01)
*B29B 9/14* (2006.01)
(Continued)

(52) U.S. Cl.
CPC ............... *B29B 15/08* (2013.01); *B29B 9/14* (2013.01); *B29C 43/18* (2013.01); *B29C 43/361* (2013.01);
(Continued)

(58) Field of Classification Search
None
See application file for complete search history.

(56) References Cited

U.S. PATENT DOCUMENTS 2,947,356 A * 8/1960 Hornbostel ............... D21F 1/46
162/276
4,654,100 A 3/1987 Yats et al.
(Continued)

FOREIGN PATENT DOCUMENTS

JP   S61211343 A   9/1986
JP   H04113829 A   4/1992
(Continued)

OTHER PUBLICATIONS

Notice of Allowance drafted Aug. 22, 2014, for Japanese Application No. 2013-548510, together with English language translation thereof.
(Continued)

*Primary Examiner* — Matthew J Daniels
*Assistant Examiner* — Mohammad M Ameen
(74) *Attorney, Agent, or Firm* — Fitch, Even, Tabin & Flannery, L.L.P.

(57) ABSTRACT

Provided herein is a molding material that attains little fluctuation in amount of short fibers and powdery resin among individual products and that allows continuous production without damaging a die. In the step of pouring, slurry is poured onto a slurry diffusion member 7 from above the slurry diffusion member 7. The slurry diffusion member 7 extends in an upward direction, and is shaped such that the
(Continued)

area of a transverse section taken along a direction orthogonal to the upward direction becomes smaller as the slurry diffusion member 7 extends in the upward direction. In the step of cleaning, a dispersion medium that is the same as the dispersion medium used in the step of pouring or water is poured onto the slurry diffusion member 7 from above the slurry diffusion member 7 to cause the short fibers and the powdery resin adhering to a slurry diffusion portion 71 of the slurry diffusion member 7 to fall down. After that, the dispersion medium is discharged from a cylindrical die 3 to accumulate the short fibers and the powdery resin in the cylindrical die 3 to obtain an aggregate 38 of the short fibers and the powdery resin. Then, the aggregate 38 is compressed.

13 Claims, 5 Drawing Sheets

(51) Int. Cl.
| | |
|---|---|
| *F16H 55/06* | (2006.01) |
| *B29C 43/18* | (2006.01) |
| *B29C 43/36* | (2006.01) |
| *B29K 25/00* | (2006.01) |
| *B29K 33/04* | (2006.01) |
| *B29K 105/00* | (2006.01) |
| *B29K 105/12* | (2006.01) |
| *B29L 15/00* | (2006.01) |
| *F16H 55/17* | (2006.01) |

(52) U.S. Cl.
CPC ...... *F16H 55/06* (2013.01); *B29C 2043/3628* (2013.01); *B29K 2025/04* (2013.01); *B29K 2033/04* (2013.01); *B29K 2105/0005* (2013.01); *B29K 2105/12* (2013.01); *B29K 2995/0087* (2013.01); *B29L 2015/003* (2013.01); *F16H 55/17* (2013.01); *F16H 2055/065* (2013.01)

(56) References Cited

U.S. PATENT DOCUMENTS

| | | | | |
|---|---|---|---|---|
| 4,895,890 | A | * | 1/1990 | Sawanobori ............ C04B 28/18 524/456 |
| 6,011,118 | A | | 1/2000 | Asagi et al. |
| 2008/0066993 | A1 | | 3/2008 | Kaneiwa et al. |
| 2013/0059949 | A1 | * | 3/2013 | Cheng .................... D21H 17/67 524/53 |

FOREIGN PATENT DOCUMENTS

| | | | |
|---|---|---|---|
| JP | H09188767 | A | 7/1997 |
| JP | 2009-154338 | A | 7/2009 |
| JP | 2009-250364 | A | 10/2009 |
| JP | 2011-152729 | * | 8/2011 |
| JP | 2011-152729 | A | 8/2011 |
| JP | 2013-141826 | A | 7/2013 |
| JP | 5621941 | B1 | 10/2014 |
| WO | 2006/126627 | A1 | 5/2006 |

OTHER PUBLICATIONS

International Search Report for PCT/JP2013/068877 dated Aug. 20, 2013; English Translation submitted herewith (6 pages).

* cited by examiner

Fig. 4A
Fig. 4B
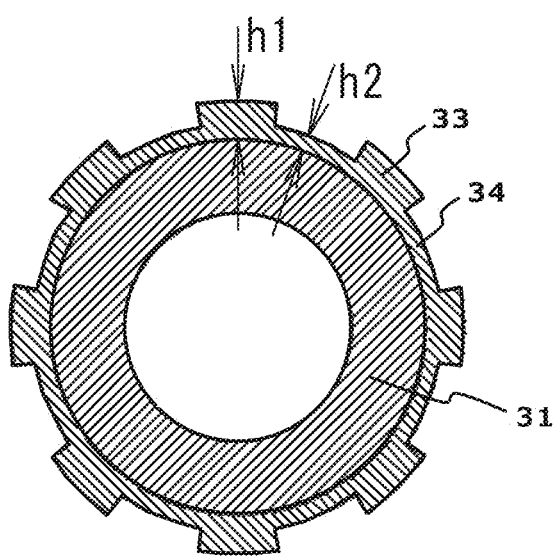
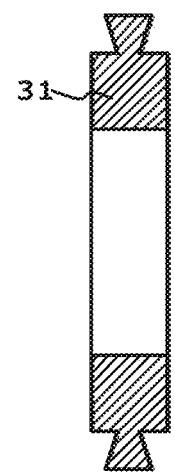

METHOD OF MANUFACTURING MOLDING MATERIAL, MOLDING DIE FOR USE IN THE MANUFACTURING METHOD, AND METHOD OF MANUFACTURING RESIN ROTATOR

TECHNICAL FIELD

The present invention relates to a method of manufacturing a molding material, a method of manufacturing a resin rotator using the molding material manufactured by the manufacturing method, and a molding die for use in the manufacturing method of the molding material.

BACKGROUND ART

Japanese Unexamined Patent Application Publication No. 2009-154338 (Patent Document 1), Japanese Unexamined Patent Application Publication No. 2009-250364 (Patent Document 2), and Japanese Unexamined Patent Application Publication No. 2011-152729 (Patent Document 3) disclose a method of manufacturing a resin rotator, in which a reinforcement fiber base material (molding material) is formed on the outer peripheral portion of a bushing using slurry obtained by mixing reinforcement short fibers and water. In the methods described in the documents mentioned above, the slurry is poured into a cylindrical die that houses a metal bushing, water is removed from the slurry such that reinforcement fibers will not leak out but be aggregated around the bushing to form an aggregate, and thereafter the aggregate is compressed to form a reinforcement fiber substrate (molding material). In the method described in Japanese Unexamined Patent Application Publication No. 2011-152729 (Patent Document 3), in particular, a slurry diffusion member is disposed at the center of the cylindrical die. The slurry diffusion member includes a conical slurry diffusion portion provided at an upper end portion thereof. Therefore, it can be expected that the slurry can be poured into the cylindrical die without significant fluctuations by pouring the slurry into the molding die onto the slurry diffusion portion from above the slurry diffusion portion.

RELATED DOCUMENTS

Patent Documents

[Patent Document 1] Japanese Unexamined Patent Application Publication No. 2009-154338
[Patent Document 2] Japanese Unexamined Patent Application Publication No. 2009-250364
[Patent Document 3] Japanese Unexamined Patent Application Publication No. 2011-152729

SUMMARY OF INVENTION

Technical Problem

If the viscosity of the slurry is low or the length of the short fibers is short, the slurry diffusion portion is sufficiently effective as in the method described in Patent Document 3. If the viscosity of the slurry is high or the length of the short fibers is long, however, it is highly likely that the slurry containing the short fibers remains on the slurry diffusion portion. If the short fibers remain on the slurry diffusion portion, the amount of short fibers per product may be fluctuated. Further, material entanglement in which the short fibers are entangled in a gap between members of a die may be caused when the fiber aggregate is compressed, which may break the die to interrupt continuous production.

It is an object of the present invention to provide a method of manufacturing a molding material that causes no damage to a die to enable continuous production.

It is another object of the present invention to provide a method of manufacturing a molding material and a molding die for use in the manufacturing method that attain little fluctuation in amount of short fibers and powdery resin among individual products and that allow continuous production without damaging the die.

It is also an object to provide a method of manufacturing a resin rotator in which a pressure is applied to a molding material while heating the molding material, thereby melting and curing a powdery resin, and the resin rotator manufactured by the manufacturing method.

Solution to Problem

The present invention provides a method of manufacturing a molding material, including a step of preparing, a step of pouring, a step of cleaning, a step of discharging, and a step of compressing. In the step of preparing, slurry is prepared by dispersing short fibers and a powdery resin in a dispersion medium. In the pouring step, the slurry is poured into a molding die comprising a cylindrical die and a slurry diffusion member. The cylindrical die has an opening portion opened in an upward direction. The slurry diffusion member is disposed at the center of the cylindrical die to extend in the upward direction, and includes a slurry diffusion portion shaped such that the area of a transverse section taken along a direction orthogonal to the upward direction becomes smaller as the slurry diffusion portion extends in the upward direction. The slurry is poured onto the slurry diffusion portion from the upward direction.

In the step of cleaning, the slurry diffusion portion is cleaned by pouring a dispersion medium that is the same as the dispersion medium used in the step of preparing or water onto the slurry diffusion portion from above the slurry diffusion portion to cause the short fibers and the powdery resin adhering to the slurry diffusion portion to fall down, after the step of pouring the slurry. When the step of cleaning is performed, the slurry or the short fibers remaining on the slurry diffusion portion can be reliably caused to fall down from the slurry diffusion portion. Thus, occurrence of so-called material entanglement can be prevented. Therefore, it is possible to provide the method of manufacturing the molding material that causes no damage to a die to enable continuous production. The dispersion medium or water poured to wash away the short fibers and the powdery resin is poured at a predetermined interval and in a small amount at a time such that the dispersion medium or water will not spill out of the die. The dispersion medium or water may be poured twice or more times (a plurality of times) to reliably wash away the short fibers and the powdery resin remaining on the upper portion of the slurry diffusion member 7. If the dispersion medium or water is poured twice or more times, the predetermined interval is determined as a time required until the liquid surface of the dispersion medium or water poured earlier becomes lower than the upper surface of the aggregate of the short fibers and the powdery resin accumulated in the die.

In the step of discharging, the dispersion medium or both of the dispersion medium and the water are discharged from the molding die to aggregate the short fibers and the powdery resin in the molding die to form an aggregate. The step of discharging is preferably performed with a reduced atmospheric pressure. Such a method in which slurry is poured into a die and water is discharged from the die is called "filtration-dehydration method". In the filtration-dehydration method, slurry containing short fibers is poured into a predetermined container, and water is removed from the slurry in the container while the slurry is subjected to filtration to aggregate the short fibers and a powdery resin to form an aggregate. If an aggregate of short fibers and a powdery resin is manufactured by such a method, a boundary portion that may cause separation will not be formed at the middle portion of the molding material. In the step of compressing, the aggregate is compressed to form a molding material, during or after the step of discharging. The step of compressing is preferably performed with a compressing force of 5 to 25 MPa. The step of compressing is preferably performed while applying heat at a temperature lower than the melting temperature of the powdery resin. If the aggregate of the short fibers and the powdery resin is continuously processed until the step of compressing using the same apparatus, there is no need for work in which an aggregate that is bulky and low in strength (that easily loses shape) is handled, thereby reducing the number of working steps.

The short fibers may be of various materials and types. The term "short fibers" as used in the claims of the present invention refers to not only fibers that are literally short in length, but also fine fibers obtained by fibrillating fibers and/or pulp fibers.

The powdery resin may be of various materials such as a thermosetting resin and a thermoplastic resin. The powdery resin may be of any grain shape. However, a granular shape is preferable. The grain size of the powdery resin may be different depending on the fiber diameter of the short fibers, but is preferably determined such that the powdery resin can be uniformly distributed in gaps in the aggregate of the short fibers. If the grain size is large, the fiber orientation of the short fibers in the aggregate may be disordered, and the short fibers and the resin inside a resin molded member may not be uniformly distributed when hot and pressure molding is performed to form the molded member.

At least one type of polymer flocculating agent capable of causing flocculation due to electrostatic attraction may be added to a mixed solution obtained by mixing the short fibers, the powdery resin, and water. In this case, the slurry diffusion portion of the slurry diffusion member preferably has a curved surface convexed upwardly at a leading portion thereof. When a polymer flocculating agent capable of causing flocculation due to electrostatic attraction is added, the polymer flocculating agent not only provides a flocculating function but also functions as a fixing agent, which fixes the short fibers to each other and fixes the short fibers and the powdery resin to each other. As a result, it is possible to increase the amount of the short fibers and the powdery resin remaining in the aggregate. That is, the fixation ratio between the short fibers and the powdery resin can be enhanced. In the present invention, the step of cleaning is performed with the use of the slurry diffusion member which includes the slurry diffusion portion having a curved surface at a leading portion thereof. Therefore, the short fibers and the powdery resin will not remain on the slurry diffusion portion even if the viscosity of the slurry is increased by preparing the slurry with the addition of the polymer flocculating agent.

The radius of curvature of the curved surface provided at the leading end of the slurry diffusion portion of the slurry diffusion member in the molding die is preferably 10 mm or more and 20 mm or less. If the radius of curvature is smaller than the above range, it is highly likely that a large number of aggregates called "flocks", which are formed by gathering a part of the short fibers and a part of the powdery resin, are stuck into the leading portion of the slurry diffusion portion. If the radius of curvature is larger than the above range, meanwhile, the flocks tend to be deposited on the slurry diffusion portion.

Preferably, the polymer flocculating agent capable of causing flocculation due to electrostatic attraction comprises a cationic polymer flocculating agent and an anionic polymer flocculating agent, and the cationic polymer flocculating agent is added and the anionic polymer flocculating agent is subsequently added to the mixed solution. When the cationic polymer flocculating agent is added to the mixed solution, a part of the short fibers and a part of the powdery resin are gathered to form a large number of aggregates called "flocks". When the anionic polymer flocculating agent is subsequently added, the flocks are aggregated to form larger flocks, which results in the formation of a large number of large flocks. When such flocks are formed, the dehydration performance is improved. As a result, water can be removed in a short time, and the fixation ratio between the short fibers and the powdery resin is improved. In particular, high dehydration performance can be achieved by using a cationic styrene-based polymer aqueous solution as the cationic polymer flocculating agent and using an anionic acrylic-based polymer aqueous solution as the anionic polymer flocculating agent.

An amphoteric polymer flocculating agent may be used as the at least one type of polymer flocculating agent capable of causing flocculation due to electrostatic attraction. The amphoteric polymer flocculating agent achieves the effect (cations) of neutralizing the short fibers and the powdery resin in the mixed solution, generates entanglement (high molecular weight) due to polymer chains, and achieves the effect of reinforcing the entanglement (high molecular weight) through electrostatic attraction due to electric charges of anions and cations.

The opening portion of the cylindrical die may be blocked by a lid member including a nozzle provided at the center to extend downward. In this case, the length and the distal end shape of the nozzle are determined such that the dispersion medium or the water is intensively poured onto the slurry diffusion portion in the step of cleaning. This allows the dispersion medium or water to be effectively poured from the nozzle onto the slurry diffusion portion, which makes it possible to reliably cause the short fibers and the powdery resin to fall down from the slurry diffusion portion.

A resin rotator can be manufactured by: applying pressure to the molding material manufactured by the manufacturing method according to the present invention while heating the molding material, thereby melting the powdery resin to generate a molten resin; impregnating a reinforcing fiber layer formed from the short fibers with the molten resin; subsequently curing the molten resin; and forming a resin molded member for the resin rotator. Then, a resin gear can be manufactured by forming teeth on an outer peripheral portion of the resin molded member, after the step of forming the resin molded member.

BRIEF DESCRIPTION OF DRAWINGS

FIG. 4 illustrates a metal bushing of the resin gear illustrated in FIG. 3, in which FIG. 4A is a plan view and FIG. 4B is a vertical sectional view.

DESCRIPTION OF EMBODIMENTS

Figure 1A:
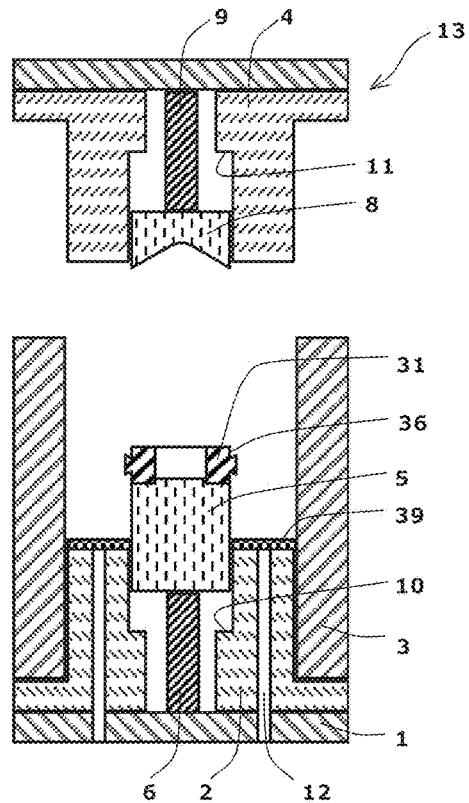
FIGS. 1A to 1D are each a schematic process diagram illustrating operation of a filtration-dehydration-compression apparatus for use in an embodiment of the present invention.

Before describing a method of manufacturing a molding material according to the present invention, an example of a filtration-dehydration-compression apparatus for use in the manufacturing method will be described below.

<Filtration-Dehydration-Compression Apparatus>

As illustrated in FIG. 1, for example, a filtration-dehydration-compression apparatus 13 for use in the method of manufacturing a molding material according to the present invention includes a base 1, a lower hollow compression mold 2, a cylindrical die 3, and an upper hollow compression mold 4. The lower hollow compression mold 2 includes a bushing support member 5 and a lower elastic member 6 provided inside. The cylindrical die 3 includes a slurry diffusion member 7 provided inside. The upper hollow compression mold 4 includes a depressing member 8 and an upper elastic member 9.

The individual members will be described in detail below.

(Base)

The base 1 supports the entire filtration-dehydration-compression apparatus. The lower hollow compression mold 2 is directly placed on the upper surface of the base 1. The base 1 is not specifically limited as long as the lower hollow compression mold 2 can be horizontally placed on the base 1 without the base 1 significantly distorted by the load.

The material of the base 1 is not specifically limited, and may be stainless steel, carbon steel, aluminum, an aluminum alloy, a magnesium alloy, or the like. From the viewpoint of the corrosion resistance, use of stainless steel is preferable.

The size of the base 1 is not specifically limited.

(Lower Hollow Compression Mold)

The lower hollow compression mold 2 is installed on the upper surface of the base 1 discussed above. The lower hollow compression mold 2 may be installed by bolts, grooves, fitting, welding, and various other methods. For ease of disassembly, the lower hollow compression mold 2 is preferably fixed to the base 1 using a plurality of bolts.

A hollow portion that is open in the vertical direction is provided inside the lower hollow compression mold 2. The bushing support member 5, on the upper surface of which a bushing 31 is to be placed, is disposed in the hollow portion.

The lower surface of the bushing support member 5 is supported by the lower elastic member 6 provided on the base 1 to extend upright. The height of the bushing support member 5 from the base 1 can be varied through expansion and contraction of the lower elastic member 6. The lower elastic member 6 may be provided indirectly on the base 1 to extend upright, rather than provided directly on the base 1 to extend upright. A plurality of lower elastic members 6 may be installed.

The lower elastic member 6 may be any member that expands and contracts to vary the height of the bushing support member 5 as discussed earlier, and may be a coil spring, a disk spring, a plate spring, a molded member of natural or synthetic rubber, or the like. Under use conditions in which the lower elastic member 6 is subjected to a strong compressive force, however, a spring is preferably used from the viewpoint of the durability. The material of the spring is not specifically limited. However, a spring made of stainless steel with high corrosion resistance and a spring that has been rust-proofed are preferably used. A spring made of rubber or the like may also be used.

The bushing 31 is to be placed on the upper surface of the bushing support member 5. The bushing support member 5 is preferably provided with a groove that prevents displacement of the bushing 31. If the bushing 31 is made of magnetic material, a magnet may be used in place of a groove.

The bushing support member 5 and the lower elastic member 6 may be connected to each other by bonding or securing. The bushing support member 5 and the lower elastic member 6 are preferably detachably connected to each other so that the bushing support member 5 can be replaced according to the type of the bushing 31.

The lower hollow compression mold 2 and the bushing support member 5 are arranged such that at least a part of the bushing support member 5 is inserted into the hollow portion of the lower hollow compression mold 2 as seen in the horizontal direction, and the amount of insertion of the bushing support member 5 into the hollow portion is varied through expansion and contraction of the lower elastic member 6. In an arrangement, the bushing support member 5 may be moved out of the hollow portion of the lower hollow compression mold 2 as seen in the horizontal direction through expansion of the lower elastic member 6 during normal operation. Such an arrangement is not practical because displacement may be caused when the bushing support member 5 is moved back into the lower hollow compression mold 2 through contraction of the lower elastic member 6.

A stepped portion 10 is provided on the inner wall of the lower hollow compression mold 2, inside which the hollow portion is formed. The stepped portion 10 contacts the lower portion of the bushing support member 5 to hinder a descent of the bushing support member 5 through contraction of the lower elastic member 6. The stepped portion 10 is preferably formed by varying the inside diameter of the hollow portion of the lower hollow compression mold 2 or providing projections on the inner wall of the lower hollow compression mold 2.

The stepped portion 10 is not necessarily provided over the entire circumference of the inner wall of the lower hollow compression mold 2, and may be provided on a part of the inner wall of the lower hollow compression mold 2. If the stepped portion 10 is provided on a part of the inner wall of the lower hollow compression mold 2, the stepped portion 10 is preferably provided at three or more locations at equal angular intervals in order to keep the bushing support member 5 horizontal.

The position of the stepped portion 10 can be varied according to the final thickness of the aggregate of the short fibers and the powdery resin. Molding material layers with an equal thickness are preferably formed to extend in the upward and downward directions from the center of the bushing 31 in the thickness direction. Specifically, the stepped portion 10 of the lower hollow compression mold 2 and a stepped portion 11 of the upper hollow compression mold 4 to be discussed later are preferably located such that the distance from the upper end of the lower hollow compression mold 2 to the center of the bushing in the thickness direction with the stepped portion 10 of the lower hollow compression mold 2 and the bushing support member 5 contacting each other is equal to the distance from the lower end of the upper hollow compression mold 4 to the center of the bushing in the thickness direction with the stepped portion 11 of the upper hollow compression mold 4 and the depressing member 8 contacting each other.

Slurry to be discussed later is poured onto a bottom portion which is a portion of the upper surface of the lower hollow compression mold 2 excluding the upper opening of the hollow portion of the lower hollow compression mold 2. Therefore, discharge ports 12 are preferably provided in the upper surface of the lower hollow compression mold 2 to discharge a liquid content in the slurry. More preferably, a pump for vacuum suctioning is connected to the discharge ports 12. Since the lower hollow compression mold 2 is used, the time for filtration and dehydration can be shortened.

(Cylindrical Die)

The cylindrical die 3 has upper and lower opening portions. The lower hollow compression mold 2 is inserted into the lower opening portion of the cylindrical die 3 to tightly contact the outer periphery of the lower opening portion so that the slurry will not leak out of the die. The upper hollow compression mold 4 to be discussed later is inserted into the upper opening portion of the cylindrical die 3.

Considering the coefficient of thermal expansion etc., it is necessary for the cylindrical die 3 to have a compressive distortion factor equivalent to the compressive distortion factor of the lower hollow compression mold 2. Therefore, the material of the cylindrical die 3 is preferably the same as the material of the lower hollow compression mold 2.

The length of the cylindrical die 3 in the vertical direction is not specifically limited. However, the cylindrical die 3 is preferably at least long enough not to cause a leak of slurry when a prescribed amount of slurry is poured into the cylindrical die 3.

The slurry diffusion member 7 is disposed in the center of the cylindrical die 3. The slurry diffusion member 7 is located on the upper surface of the bushing 31 placed on the bushing support member 5. As described in relation to the upper surface of the bushing support member 5, the lower surface of the slurry diffusion member 7 is preferably provided with a groove that prevents displacement of the bushing 31. If the bushing 31 is made of magnetic material, a magnet may be used in place of a groove.

Figure 1B:
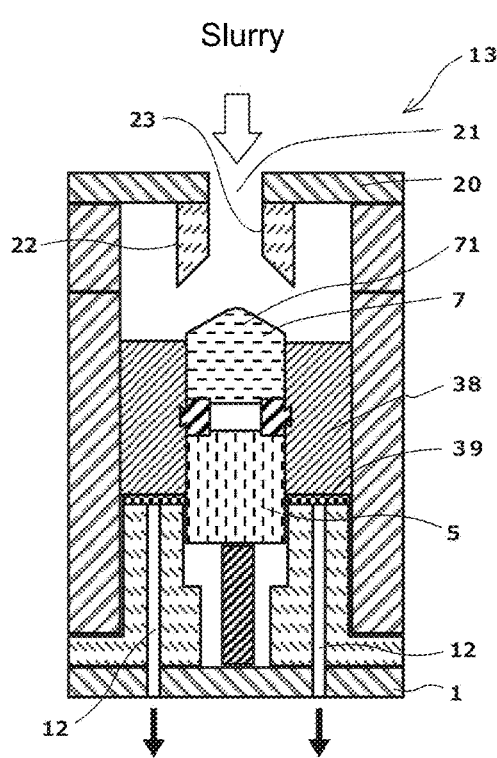
Figure 2A:
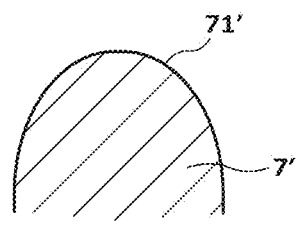
FIGS. 2A and 2B each illustrate a modification of a slurry diffusion portion.
Figure 2B:
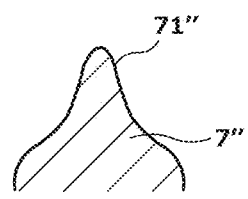

The slurry diffusion member 7 includes a slurry diffusion portion 71 provided at an upper end portion thereof. The slurry diffusion portion 71 extends in the upward direction, and is shaped such that the area of a transverse section taken along a direction orthogonal to the upward direction becomes smaller as the slurry diffusion portion 71 extends in the upward direction. In the example of FIG. 1B, the slurry diffusion portion 71 has a conical shape with its apex located in the upward direction. The apex of the conical shape has a curved surface with the radius of curvature of 10 mm or more and 20 mm or less. When the slurry is poured into the cylindrical die 3 onto the slurry diffusion portion 71 from above the slurry diffusion portion 71, the short fibers and the powdery resin in the slurry can be uniformly dispersed around the bushing without the short fibers and the powdery resin, which have been flocculated, being caught by the upper end of the slurry diffusion member 7. As illustrated in FIG. 2A, the surface shape of a slurry diffusion portion 71' may be hemispherical. As illustrated in FIG. 2B, a curved surface 71" may be projected at the leading portion and recessed at the base portion.

It is not necessary that the slurry diffusion member 7 should be fixed to the upper surface of the bushing 31 unless any displacement occurs, and the slurry diffusion member 7 may be simply placed on the upper surface of the bushing 31.

(Upper Hollow Compression Mold)

The upper hollow compression mold 4 is disposed opposite to the lower hollow compression mold 2, and inserted into the upper opening portion of the cylindrical die 3. The outer periphery of the upper hollow compression mold 4 and the inner wall of the cylindrical die 3 tightly contact each other when the upper hollow compression mold 4 is inserted, which hinders a leak of the slurry.

Considering the coefficient of thermal expansion etc., it is necessary for the upper hollow compression mold 4 to have a compressive distortion factor equivalent to the compressive distortion factor of the lower hollow compression mold 2 and the cylindrical die 3. Therefore, the material of the upper hollow compression mold 4 is preferably the same as the material of the lower hollow compression mold 2 and the cylindrical die 3.

The depressing member 8 is provided in the hollow portion of the upper hollow compression mold 4. The depressing member 8 contacts the slurry diffusion portion 71 of the slurry diffusion member 7. The upper surface of the depressing member 8 is supported by the upper elastic member 9. The position of the depressing member 8 is varied through expansion and contraction of the upper elastic member 9.

The upper elastic member 9 may be the same as or different from the lower elastic member 6 discussed earlier. Under use conditions in which the lower hollow compression mold 2 is heated or the upper elastic member 9 is subjected to a strong compressive force, however, a spring is preferably used as the upper elastic member 9 from the viewpoint of the durability. The upper elastic member 9 and the lower elastic member 6 are preferably springs having the same spring constant. The thus configured elastic members allow the molding material to be compressed from above and from below at an equal speed, which reduces fluctuations in density of the short fibers and the powdery resin in the vertical direction.

The depressing member 8 and the upper elastic member 9 may be connected to each other by bonding or securing. The depressing member 8 and the upper elastic member 9 are preferably detachably connected to each other so that the depressing member 8 can be replaced according to the type of the bushing 31.

The upper hollow compression mold 4 and the depressing member 8 are arranged such that at least a part of the depressing member 8 is inserted into the hollow portion of the upper hollow compression mold 4 as seen in the horizontal direction, and the amount of insertion of the depressing member 8 into the hollow portion is varied through expansion and contraction of the upper elastic member 9. In an arrangement, the depressing member 8 may be moved out of the hollow portion of the upper hollow compression mold 4 as seen in the horizontal direction through expansion of the upper elastic member 9 during normal operation. Such an arrangement is not practical because displacement may be caused when the depressing member 8 is moved back into the upper hollow compression mold 4 through contraction of the upper elastic member 9.

A stepped portion 11 is provided on the inner wall of the upper hollow compression mold 4, inside which the hollow portion is formed. The stepped portion 11 contacts the upper portion of the depressing member 8 to hinder an ascent of the depressing member 8 through contraction of the upper elastic member 9. The stepped portion 11 is preferably formed by varying the inside diameter of the hollow portion of the upper hollow compression mold 4 or providing projections on the inner wall of the upper hollow compression mold 4.

The stepped portion 11 is not necessarily provided over the entire circumference of the inner wall of the upper hollow compression mold 4, and may be provided on a part of the inner wall of the upper hollow compression mold 4. If the stepped portion 11 is provided on a part of the inner wall of the upper hollow compression mold 4, the stepped portion 11 is preferably provided at three or more locations at equal angular intervals in order to keep the depressing member 8 horizontal.

The position of the stepped portion 11 can be determined as discussed in relation to the stepped portion 10 of the lower hollow compression mold 2. Specifically, the stepped portion 10 of the lower hollow compression mold 2 discussed above and the stepped portion 11 of the upper hollow compression mold 4 are preferably located such that the distance from the upper end of the lower hollow compression mold 2 to the center of the bushing in the thickness direction with the stepped portion 10 of the lower hollow compression mold 2 and the bushing support member 5 contacting each other is equal to the distance from the lower end of the upper hollow compression mold 4 to the center of the bushing in the thickness direction with the stepped portion 11 of the upper hollow compression mold 4 and the depressing member 8 contacting each other.

The temperature of the lower surface of the upper hollow compression mold 4 may be adjustable. If the lower surface of the upper hollow compression mold 4 is heated during compression, a liquid content adhering to the short fibers and the powdery resin can be quickly dried. In this event, the heating temperature should be equal to or less than the melting temperature of the powdery resin being used. This is because if the powdery resin is heated at a temperature more than the melting temperature of the powdery resin, the powdery resin adheres to the lower surface of the upper hollow compression mold 4 and the inner peripheral surface of the cylindrical die 3, which makes continuous production difficult.

The temperature may be adjusted by varying the resistance value of a heater with a variable resistor, or simply by turning on and off a heater.

(Slurry Injection Upper Mold)

The filtration-dehydration-compression apparatus may include a slurry injection upper mold 20 that constitutes a lid member that allows pouring of slurry as necessary (see FIG. 1B). In order to fabricate a molding material in which the weight of short fibers and a powdery resin accumulated around the bushing 31 is uniform, a slurry injection hole 21 of the slurry injection upper mold 20 is located over the slurry diffusion member 7. As in the embodiment, the slurry injection hole 21 is preferably disposed directly above the slurry diffusion member 7.

In the embodiment, a nozzle 22 is fixed to the back surface of the slurry injection upper mold 20. The nozzle 22 includes a through hole 23 that communicates with the slurry injection hole 21. The nozzle 22 extends toward the slurry diffusion member 7. The length and the distal end shape of the nozzle 22 are determined such that the dispersion medium or the water is intensively poured onto the slurry diffusion portion 71 in a step of cleaning to be discussed later. Specifically, the nozzle 22 is shaped such that the end surface of the leading portion of the nozzle 22 becomes larger as the nozzle 22 extends toward the slurry diffusion portion 71 (the area of a transverse section taken along a direction orthogonal to the vertical direction becomes larger as the nozzle 22 extends toward the slurry diffusion portion 71). The distance between the end surface of the leading portion of the nozzle 22 and the surface of the slurry diffusion portion 71 is determined as desired according to the viscosity of the slurry, the length of the short fibers, and so forth.

The nozzle 22 is provided to allow the dispersion medium or the water to be intensively and efficiently poured onto the slurry diffusion portion 71 in order to prevent the short fibers and the powdery resin from being entangled between die components to break the die in a step of compressing (in a step of compressing an aggregate of the short fibers and the powdery resin), which is performed after a step of pouring the slurry, if the short fibers and the powdery resin adhere to and remain on the slurry diffusion portion 71 of the slurry diffusion member 7. That is, if the nozzle 22 is provided, it is possible to efficiently cause the short fibers and the powdery resin adhering to the slurry diffusion member 7 to fall down with a small amount of the dispersion medium or the water when the dispersion medium or the water is poured from the nozzle 22 after the slurry is poured.

The slurry injection upper mold 20 preferably tightly contacts the peripheral edge portion of the opening portion of the cylindrical die 3 during pouring of the slurry. This prevents the slurry from overflowing out of the cylindrical die 3.

<Bushing>

The bushing 31 is held between the bushing support member 5 and the slurry diffusion member 7. The bushing 31 will be discussed in detail below.

The bushing 31 is located in the center of the molding material in the radial direction. If the desired final product is a resin gear, the bushing 31 is fixed to a rotary shaft to be used. The material of the bushing 31 is not specifically limited. In consideration of the strength, however, the bushing 31 is preferably made of metal.

Figure 3:
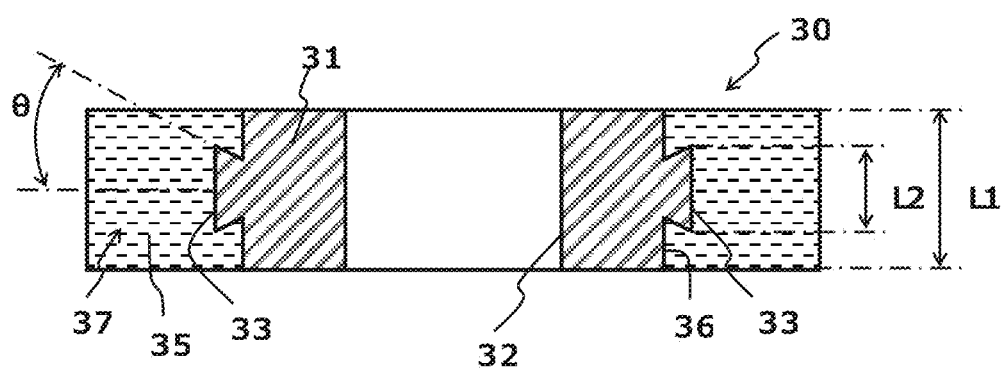
FIG. 3 is a vertical sectional view of a resin gear manufactured according to the embodiment of the present invention.

FIG. 3 is a schematic vertical sectional view of a resin gear 30. The resin gear 30 includes a metal bushing 31 rotatably fixed to a rotary shaft (not illustrated). A through hole 32 to be fitted with the rotary shaft (not illustrated) is formed in the center portion of the metal bushing 31.

A plurality of projecting portions 33 to serve as detent portions are integrally formed on the outer peripheral portion of the metal bushing 31 at predetermined intervals in the circumferential direction.

A specific example of the metal bushing 31 will be described. The thickness L2 of the plurality of projecting portions 33 as measured in the axial direction is smaller than the thickness L1 of the metal bushing 31 as measured in the axial direction. The projecting portions 33 which serve as detent portions have an undercut shape in which the top portion has a large thickness and the base portion has a small thickness. The undercut shape is intended to hinder idling of only the metal bushing 31 due to an interface fracture that occurs at the interface with the surrounding molded resin portion. The angle θ in the sectional surface in the direction of the rotational axis of the metal bushing 31 is 5 to 40°.

In order to enhance the effect of the detent portions to endure a load in the rotational direction, as illustrated in FIG. 4, the metal bushing 31 preferably includes the projecting portions 33 serving as detent portions and having at least a height h1, and recessed portions 34 formed at the bottom portion of the metal bushing 31 between two projecting portions 33 and having a height h2, the projecting portions 33 and the recessed portions 34 being alternately arranged. If the metal bushing 31 having the projecting portions 33 having such an undercut shape and having an angle θ of 5 to 40°, preferably 10 to 35°, is used, the plurality of projecting portions 33 which serve as detent portions are completely embedded in the molding material to provide sufficient strength of the mechanical coupling between the molding material and the metal bushing 31.

<Slurry>

Next, the slurry used in the embodiment will be described. The present invention is not limited to the use of the slurry used in the embodiment.

(Dispersion Medium for Slurry)

The dispersion medium used for the slurry is not specifically limited as long as the short fibers and the powdery resin can be dispersed in the dispersion medium and the dispersion medium will not degrade the properties of the short fibers and the powdery resin being used. Examples of the dispersion medium include an organic solvent, a mixture of an organic solvent and water, and water. Use of water, which is economical and imposes little load on the environment, is particularly preferable.

If an organic solvent is used, sufficient caution should be given to safety. An organic solvent such as methanol, ethanol, acetone, toluene, and diethyl ether may be used.

At least one type of polymer flocculating agent capable of causing flocculation due to electrostatic attraction may be added to a mixed solution obtained by mixing the short fibers, the powdery resin, and the dispersion medium.

(Short Fibers)

The short fibers to be dispersed in the dispersion medium preferably have a melting point or a decomposition temperature of 250° or more. Use of such short fibers provides a molding material or a resin gear with high heat resistance in which the short fibers are not thermally degraded at the molding temperature during molding, the processing temperature, and the atmospheric temperature during actual use.

As such short fibers, at least one kind of short fibers selected from para-aramid fibers, meta-aramid fibers, carbon fibers, glass fibers, boron fibers, ceramic fibers, ultra-high strength polyethylene fibers, polyketone fibers, poly(p-phenylenebenzobisoxazole) fibers, wholly aromatic polyester fibers, polyimide fibers, and polyvinyl alcohol fibers is preferably used. In particular, mixed fibers of para-aramid fibers and meta-aramid fibers have good balance among heat resistance, strength, and processability after resin molding.

The short fibers preferably contain at least 20% by volume or more of high-strength high-modulus fibers having a tensile strength of 15 cN/dtex or more and a tensile modulus of 350 cN/dtex or more.

The single fiber fineness (thickness) of the short fibers is preferably in the range of 0.1 to 5.5 dtex, more preferably 0.3 to 2.5 dtex.

The length of the short fibers is not specifically limited. However, the length of the short fibers is preferably 1 to 12 mm, more preferably 2 to 6 mm. If the fiber length is less than 1 mm, the mechanical characteristics of the fiber-reinforced resin molded member are gradually degraded. If the fiber length is more than 12 mm, not only the short fibers are entangled so much that it is difficult to forma uniform fabric, but also the short fibers dispersed in the dispersion medium disadvantageously gradually clog a pipe for transport of the short fibers to the filtration-dehydration-compression apparatus.

The range of the proportion of the short fibers contained in the resin molded member is preferably selected such that the resin molded member has high strength, the short fibers are reliably charged, and the resin molded member is impregnated with a resin well. The range of the proportion of the short fibers is particularly preferably 35 to 45% by volume.

In order to provide a molding material 35 integrated with the metal bushing 31 using the filtration-dehydration-compression apparatus illustrated in FIG. 1 with strength for maintaining its shape during movement or transfer to the next process, it is desirable that the short fibers should contain fine fibers obtained by fibrillating aramid fibers, the fine fibers having a freeness of 100 to 400 ml and being contained in an amount of 30% by mass or less in the short fibers.

(Powdery Resin)

The powdery resin may be of various materials such as a thermosetting resin and a thermoplastic resin. Examples of the powdery resin include a combination of one or more resins selected from an epoxy resin, a polyaminoamide resin, a phenol resin, an unsaturated polyester resin, a polyimide resin, a polyether sulfone resin, a polyether ether ketone resin, a polyamide-imide resin, a polyamide resin, a polyester resin, a polyphenylene sulfide resin, a polyethylene resin, and a polypropylene resin. Among these, a phenol resin is preferable from the viewpoint of the strength, heat resistance, etc. of the cured resin.

The powdery resin may be of any grain shape. However, a granular shape is preferable. The grain size of the powdery resin may be different depending on the fiber diameter of the short fibers, but is preferably equal to or less than 50 μm. The grain size is measured by the metal mesh sieving method prescribed by JIS-Z8801-1. This allows the powdery resin to be uniformly distributed in gaps in the aggregate of the short fibers.

(Dispersion Concentration of Short Fibers and Powdery Resin)

The dispersion concentration of the short fibers and the powdery resin in the dispersion medium is preferably 0.3 g/liter or more and 20 g/liter or less.

<Resin Rotator>

A resin gear suitably manufactured using the molding material manufactured in the embodiment will be described below.

A resin rotator is obtained by: applying pressure to the molding material while heating the molding material, thereby melting the powdery resin to generate a molten resin; impregnating a reinforcing fiber layer formed from the short fibers with the molten resin; subsequently curing the molten resin; and forming a resin molded member for the resin rotator. In addition, teeth can be formed on the outer peripheral portion of the resin molded member to form the resin molded member into a gear shape. More specifically, the resin gear preferably has a metal bushing 31 to be fitted with a rotary shaft that rotates the gear, and a tooth portion disposed around the metal bushing 31.

The tooth portion is disposed on the outer periphery of the metal bushing 31 discussed earlier. More specifically, as illustrated in FIG. 3 described earlier, one molding material 35 is disposed at a position on the outer side of an outer peripheral portion 36 of the metal bushing 31, and fitted with the outer peripheral portion 36. Then, the molding material 35 is impregnated with a resin, and the resin is cured to form a resin molded member 37. The tooth portion is formed on the outer periphery of the resin molded member 37.

<Drive of Filtration-Dehydration-Compression Apparatus>

The filtration-dehydration-compression apparatus 13 includes a drive device configured to vary the distance between the lower hollow compression mold 2 and the upper hollow compression mold 4 discussed earlier. The drive source is not specifically limited, and an electric pressing machine with controllable moving speed and pressing force may be used.

Either of the lower hollow compression mold 2 and the upper hollow compression mold 4 may be driven. For ease of disassembly and cleaning, however, the upper hollow compression mold 4 is preferably driven up and down.

<Method of Manufacturing Molding Material According to First Embodiment>

A method of manufacturing a molding material according to a first embodiment of the present invention will be described below.

As schematically illustrated in FIGS. 1 and 3, the molding material 35 is formed using the filtration-dehydration-compression apparatus 13, by forming an aggregate 38 of the short fibers and the powdery resin on the outer side of the outer peripheral portion 36 of the metal bushing 31 and compressing the aggregate 38 of the short fibers and the powdery resin in the axial direction of a rotary shaft (not illustrated) that rotates the metal bushing 31.

First, the step of pouring, in which the short fibers and the powdery resin are accumulated around the outer peripheral portion of the metal bushing 31 by a filtration-dehydration method, will be described.

<Step of Pouring>

In the step of pouring, slurry is poured into the cylindrical die 3 and onto the slurry diffusion member 7 from above the cylindrical die 3. The slurry is temporarily stored in the cylindrical die 3, or the dispersion medium is discharged from the cylindrical die 3 along with the pouring of the slurry.

As illustrated in FIG. 1B, the lower hollow compression mold 2 has the discharge ports 12 to discharge the dispersion medium in order to provide permeability to the dispersion medium contained in the aggregate 38 of the short fibers and the powdery resin. A vacuum suction pump (not illustrated) may be connected to the discharge ports 12 to complete discharging of the dispersion medium in a short time. In the example, a bottom member 39 is disposed on the upper surface of the lower hollow compression mold 2 to prevent an outflow of the short fibers during the discharging of the dispersion medium from the discharge ports 12.

A wire net can be used as the bottom member 39. The mesh size of the wire net is preferably 10 mesh or more and 100 mesh or less. The term "mesh size" as used herein is as prescribed by JIS G 3555.

The bushing support member 5 and the slurry diffusion member 7 interpose and support a portion of the metal bushing 31 located on the inner side with respect to the outer peripheral portion 36 from both sides in the direction of extension of the center line of the cylindrical die 3 such that the short fibers and the powdery resin will not enter the inner side of the metal bushing 31 with respect to the outer peripheral portion 36.

To interpose the metal bushing 31 between the bushing support member 5 and the slurry diffusion member 7, the slurry diffusion member 7 is placed on the bushing 31 to hold the metal bushing 31 using the weight of the slurry diffusion member 7 as illustrated in FIG. 1B.

As illustrated in FIG. 1B, slurry formed by dispersing short fibers and a powdery resin in a dispersion medium is supplied from the slurry injection hole 21 with the slurry injection upper mold 20 tightly contacting the peripheral edge portion of the opening portion of the cylindrical die 3.

The slurry is supplied onto the slurry diffusion member 7 from above the slurry diffusion member 7, which causes the short fibers and the powdery resin to be diffused by the slurry diffusion portion 71 to be spread as uniformly distributed around the slurry diffusion member 7.

<Step of Cleaning>

In the step of cleaning, a dispersion medium that is the same as the dispersion medium used in the step of pouring or water is poured onto the slurry diffusion member 7 from above the slurry diffusion member 7 to cause the short fibers and the powdery resin adhering to the slurry diffusion portion 71 of the slurry diffusion member 7 to fall down.

After the slurry is poured in the step of pouring, short fibers and a powdery resin adhere to and remain on the upper portion of the slurry diffusion portion 71 of the slurry diffusion member 7. If short fibers and a powdery resin remain on the slurry diffusion member 7, the short fibers and the powdery resin may be entangled between the upper hollow compression mold 4 and the depressing member 8 and the slurry diffusion member 7 during the discharging of the dispersion medium in the step of discharging or in the step of compressing in which the aggregate of the short fibers and the powdery resin is compressed after the discharging of the dispersion medium. If such entanglement occurs, the die may be broken to interrupt continuous production. Thus, after the slurry is poured, a dispersion medium that is the same as the dispersion medium for the slurry or water is poured from the slurry injection hole 21 via the nozzle 22 to wash away the short fibers and the powdery resin remaining on the upper surface of the slurry diffusion portion 71 of the slurry diffusion member 7.

Pouring of the dispersion medium or water to wash away the short fibers and the powdery resin is preferably started at the timing when the liquid surface of the slurry in the die reaches the upper surface of the aggregate of the short fibers and the powdery resin accumulated in the die.

The dispersion medium or water poured to wash away the short fibers and the powdery resin is poured in a small amount such that the dispersion medium or water will not spill out of the die. The dispersion medium or water may be poured twice or more times (a plurality of times) to reliably wash away the short fibers and the powdery resin remaining on the upper portion of the slurry diffusion member 7.

If the dispersion medium or water is poured twice or more times, the interval between pourings is preferably defined as a time required until the liquid surface of the dispersion medium or water poured earlier is lowered to the upper surface of the aggregate of the short fibers and the powdery resin accumulated in the die.

<Step of Discharging and Step of Compressing>

In the step of discharging, the dispersion medium is discharged from the cylindrical die 3 to accumulate the short fibers and the powdery resin in the cylindrical die 3 to obtain an aggregate 38 of the short fibers and the powdery resin.

In the step of compressing, the aggregate 38 of the short fibers and the powdery resin is compressed.

More specifically, as illustrated in FIG. 1B, the space in the cylindrical die 3 is subjected to vacuum suctioning to discharge a liquid content from the plurality of discharge ports 12 provided in the lower hollow compression mold 2 to fabricate an aggregate 38 of the short fibers and the powdery resin that surrounds the outer peripheral portion of the metal bushing 31.

Using the bushing support member 5 and the slurry diffusion member 7 in this way facilitates positioning and support of the metal bushing 31.

The shape of the outer peripheral surface of the aggregate 38 of the short fibers and the powdery resin is determined by the shape of the inner peripheral surface of the cylindrical die 3.

Figure 1C:
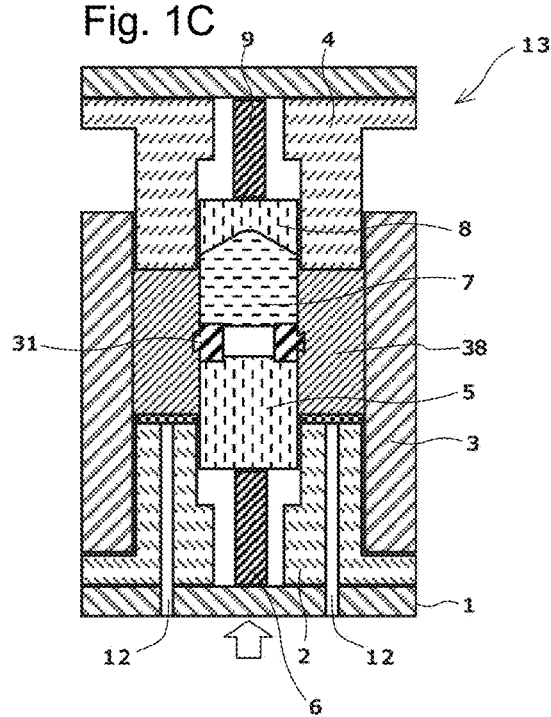

After a liquid content is discharged from the plurality of discharge ports 12 provided in the lower hollow compression mold 2, the bushing support member 5, the slurry diffusion member 7, and the lower hollow compression mold 2 are moved upward as illustrated in FIG. 1C. Then, first, the slurry diffusion member 7 and the depressing member 8 contact each other to fix the metal bushing 31 by the forces of the upper elastic member 9 and the lower elastic member 6. In the example illustrated in FIG. 1, springs having an equal spring constant are used as the upper elastic member 9 and the lower elastic member 6.

Figure 1D:
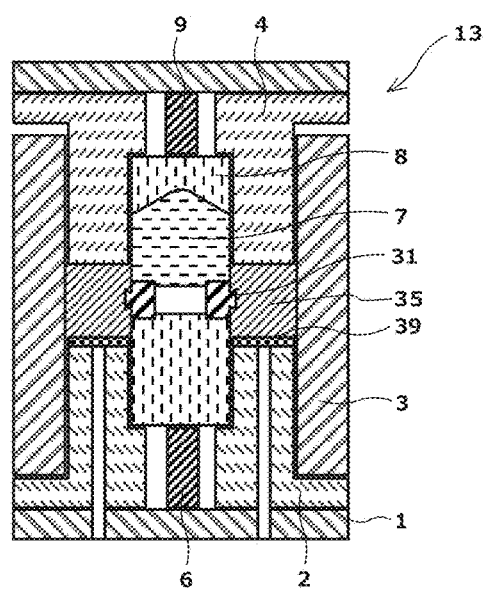

Further, the bushing support member 5, the slurry diffusion member 7, and the lower hollow compression mold 2 are raised until the bushing support member 5 and the stepped portion 10 provided on the lower hollow compression mold 2 contact each other and the depressing member 8 and the stepped portion 11 provided on the lower hollow compression mold 4 contact each other so that the distance between the lower hollow compression mold 2 and the upper hollow compression mold 4 will not be reduced any further (see FIG. 1D).

The thickness of the molding material will be described in detail with reference to FIG. 5.

Figure 5A:
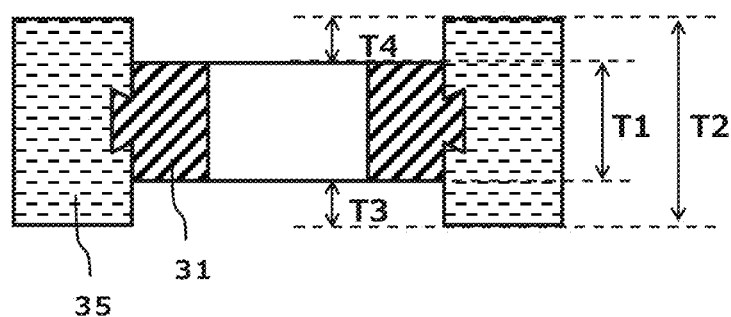
FIG. 5A is a vertical sectional view of a molding material integrated with the bushing.

As illustrated in FIG. 5A, the relationship between the thickness T1 of the metal bushing 31 and the thickness T2 of the molding material 35 (in the compressed state) determined by the stepped portions 10 and 11 (see FIG. 1) may be selected as desired from the following three patterns: (A) T1=T2; (B) T1>T2; and (C) T1<T2.

The relationship between the distance T3 from the lower surface of the metal bushing 31 to the lower surface of the molding material 35 in the compressed state and the distance T4 from the upper surface of the metal bushing 31 to the upper surface of the molding material 35 in the compressed state may be selected as desired from the following three patterns: (D) T3=T4; (E) T3>T4; and (F) T3<T4. The selection can be made by changing the respective heights L3 and L4 of the stepped portions 10 and 11 (see FIG. 5B).

Further, the selection from (A) to (C) and the selection from (D) to (F) discussed above may be made in combination.

The duration and the temperature of the compression may be changed as desired according to the type of the short fibers and the powdery resin being used. By compressing the molding material 35 while being heated by a heater attached to the upper hollow compression mold 4, it is possible to shorten the time required to remove a liquid contained in the molding material 35 after filtration and dehydration, and to suppress temporal variations in thickness of the molding material 35 after being compressed.

In addition, by performing vacuum suctioning from the discharge ports 12 of the lower hollow compression mold 2 during the compression, it is possible to shorten the time required to remove a liquid contained in the molding material 35 after filtration and dehydration.

The step of discharging and the step of compressing may be performed at the same time, or the step of compressing may be performed after the step of discharging is performed.

If the steps are sequentially performed, the dispersion medium and the molding material can be sufficiently separated from each other in advance. Thus, the molding material can be compressed with the temperature of the upper mold reduced to a lesser degree if the upper mold is heated during compression in the step of compressing. If the steps are performed at the same time, the time for one step can be saved, and the molding material can be manufactured in a shorter time.

<Step of Forming>

A step of forming will be described below. The step of forming includes: applying pressure to the molding material 35 while heating the molding material 35, thereby melting the powdery resin to generate a molten resin; impregnating a reinforcing fiber layer formed from the short fibers with the molten resin; subsequently curing the molten resin; and forming a resin molded member.

Figure 6:
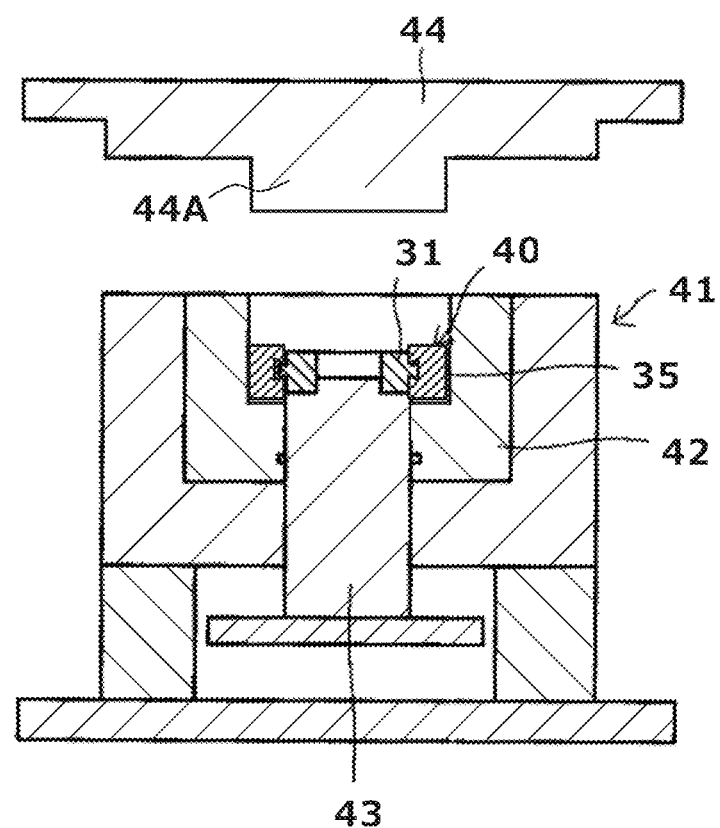
FIG. 6 is a schematic process diagram illustrating fabrication of the resin gear according to the embodiment of the present invention.

As illustrated in FIG. 6, a resin rotator molding semifinished product 40 including the molding material 35 provided on the bushing 31 is disposed in a die 41 heated in advance. After that, heating and pressing the molding material is performed to cure the powdery resin to form a resin rotator including a resin molded member. The die 41 includes a fixed die 42, a movable die 43 disposed in the center of the fixed die 42 to be displaceable in the vertical direction, and an upper die 44 paired with the movable die 43 to hold the bushing 31 between the movable die 43 and the upper die 44. When a pressing portion 44A of the upper die 44 is inserted into the fixed die 42 to press the bushing 31, the movable die 43 is displaced downward according to the amount of insertion of the upper die 44. When the resin is cured, a resin rotator including a resin molded member molded with the molding material 35 as a core member is taken out of the die 41 to complete manufacture of the resin molded member.

<Step of Forming Teeth>

Teeth are formed on the outer peripheral portion of the resin molded member which has been impregnated with a resin to be cured. The teeth may be provided either during molding or by cutting after the molding. In order to achieve higher accuracy, however, the teeth are preferably provided by cutting.

Second Embodiment

In the first embodiment, slurry is prepared by mixing short fibers, a powdery resin, and water. When such slurry is used, the yield of the short fibers and the powdery resin in the molding material 35 may be reduced if the mesh size of the wire net used as the bottom member 39 of the lower hollow compression mold 2 illustrated in FIG. 1 is small (the dimension of opening of the wire net is larger), for example, because of the low viscosity of the slurry. Thus, if the grain size of the powdery resin is 10 μm when a wire net having a mesh size of 100 μm each side is used, for example, a large amount of the powdery resin may be discharged together with water because of the poor filtration performance. If the mesh size is larger (the dimension of opening of the wire net is smaller) in order to prevent such an event, the dehydration time may be extended although the filtration performance is improved. Thus, in the second embodiment, in order to address such an issue, at least one type of polymer flocculating agent capable of causing flocculation due to electrostatic attraction is added to a mixed solution obtained by mixing the short fibers, the powdery resin, and the dispersion medium. When a polymer flocculating agent capable of causing flocculation due to electrostatic attraction is added, the polymer flocculating agent capable of causing flocculation due to electrostatic attraction not only provides a flocculating function but also functions as a fixing agent, which fixes the short fibers to each other and fixes the short fibers and the powdery resin to each other. As a result, it is possible to increase the amount of the short fibers and the powdery resin remaining in the aggregate. That is, the fixation ratio between the short fibers and the powdery resin can be enhanced to improve the yield.

Any polymer flocculating agent capable of causing flocculation due to electrostatic attraction may be used as long as the fixation ratio between the short fibers and the powdery resin can be enhanced and the dehydration performance is not significantly impaired. Examples of a cationic polymer flocculating agent include a styrene-based polymer, a polyamine condensation product, a dicyandiamide condensation product, a cation-modified acrylic-based copolymer, polymethacrylic acid ester series, and a polyamidine hydrochloride. Examples of an anionic polymer flocculating agent include an acrylic-based copolymer, sulfonated polyphenol, a polyphenol-based resin, polyacrylic acid ester series, and a polyacrylic acid sodamide derivative.

In a typical method of causing flocculation using the polymer flocculating agent, the cationic polymer flocculating agent is added and the anionic polymer flocculating agent is subsequently added to the mixed solution. When the cationic polymer flocculating agent is added to the mixed solution, apart of the short fibers and a part of the powdery resin are gathered to form a large number of aggregates called "flocks". When the anionic polymer flocculating agent is subsequently added, the flocks are aggregated to generate larger flocks, which results in the formation of a large number of large flocks. When such flocks are formed, the dehydration performance is improved. As a result, water can be removed in a short time, and the fixation ratio between the short fibers and the powdery resin is improved. In particular, high dehydration performance can be achieved by using a cationic styrene-based polymer aqueous solution as the cationic polymer flocculating agent and using an anionic acrylic-based polymer aqueous solution as the anionic polymer flocculating agent.

Alternatively, an amphoteric polymer flocculating agent can be used as the polymer flocculating agent. The amphoteric polymer flocculating agent achieves the effect (cations) of neutralizing the short fibers and the powdery resin in the mixed solution, generates entanglement (high molecular weight) due to polymer chains, and achieves the effect of reinforcing the entanglement (high molecular weight) through electrostatic attraction due to electric charges of anions and cations. Examples of the amphoteric polymer flocculating agent include an acrylamide/acrylic acid/alkylaminoacrylate quaternary salt copolymer, polyacrylic acid ester series, and polymethacrylic acid ester series.

EXAMPLES

Examples according to the present invention will be described below.

Example 1

In order to prepare slurry, a tank filled with water in such an amount that the concentration of short fibers and a powdery resin poured would be 4 g/liter was prepared. Then, short fibers in such an amount that the total amount of the short fibers in the resin molded member would be 40% by volume and a powdery resin in such an amount that the total amount of the powdery resin in the resin molded member would be 60% by volume were poured into the tank. Specifically, 50% by mass of para-aramid fibers "Technora (trademark)" manufactured by Teijin Ltd and having an aspect ratio of 200, 45% by mass of meta-aramid fibers "Teijinconex (trademark)" manufactured by Teijin Ltd and having an aspect ratio of 200, and 5% by mass of fine fibers "Kevlar (trademark)" manufactured by DuPont and fibrillated to a freeness value of 300 ml were poured as a fiber chop to be used as the short fibers. Meanwhile, phenol resin powder "Bellpearl (trademark)" manufactured by Air Water Bellpearl Inc. and having a grain size of 20 μm was poured as the powdery resin. Next, water in the tank was stirred by a stirrer to disperse the fiber chop and the phenol resin powder to manufacture mixture or slurry.

In this event, a cationic styrene-based polymer aqueous solution available from Meisei Chemical Works, Ltd. under the name of "Cerafix ST" (trademark) was added to the mixture as the cationic polymer flocculating agent, after which the mixture was stirred, and an anionic acrylic-based polymer aqueous solution available from Meisei Chemical Works, Ltd. under the name of "Filex M" (trademark) was subsequently added to the mixture as the anionic polymer flocculating agent, after which the mixture was stirred, to obtain the slurry to be used in the embodiment. The amount of the cationic styrene-based polymer aqueous solution to be added was 0.2% by mass with respect to the total amount of the short fibers and the powdery resin. The amount of the anionic acrylic-based polymer aqueous solution to be added was 0.1% by mass with respect to the total amount of the short fibers and the powdery resin.

Next, the filtration-dehydration-compression apparatus illustrated in FIG. 1A was used to position the metal bushing 31 on the bushing support member 5, and to place the slurry diffusion member 7 on the metal bushing 31 so as not to be displaced, to hold the metal bushing 31 between the bushing support member 5 and the slurry diffusion member 7. The center angle of the conical surface of the slurry diffusion portion 71, which has a conical shape that projects upward, of the slurry diffusion member 7 is 90°. The apex of the slurry diffusion portion 71 has a curved surface shape with a radius of curvature of 15 mm.

The projecting portions 33 and the recessed portions 34 of the metal bushing 31 being used (see FIG. 4) had h1 and h2 values of 2 mm and 0.5 mm, respectively. The projecting portions 33 had an undercut shape. The angle θ between an imaginary center transverse sectional surface and a side surface of the metal bushing 31 was 20°.

The lower hollow compression mold 2 was located such that the distance from the center of the metal bushing 31 in the axial direction to the upper surface of the bottom member 39 was 50 mm.

The slurry described above was poured into the filtration-dehydration-compression apparatus with the slurry injection upper mold 20 illustrated in FIG. 1B and the cylindrical die 3 tightly contacting each other. Then, the space in the cylindrical die 3 was subjected to vacuum suctioning to discharge water from the plurality of discharge ports 12 provided in the lower hollow compression mold 2, separating the fiber chop and the phenol resin powder and the water to obtain a cylindrical aggregate 38 of the short fibers and the powdery resin. After the fiber chop and the phenol resin powder and the water were separated from each other by the vacuum suctioning, water was poured from the slurry injection hole 21 to wash away the fiber chop and the phenol resin powder remaining on the upper side of the slurry diffusion member 7. The slurry injection hole 21 was disposed directly above the slurry diffusion member 7.

In order to prevent an outflow of the fiber chop and the phenol resin powder from the discharge ports 12 during the discharging of the water, the bottom member 39 was disposed on the lower hollow compression mold 2. A wire net made of metal and having a mesh size of 20 mesh was used as the bottom member 39.

Next, the aggregate 38 was compressed so that the fiber chop and the phenol resin powder were further more deeply engaged with the detent portions of the metal bushing 31. As illustrated in FIG. 1C, the lower hollow compression mold 2, the cylindrical die 3, the bushing support member 5, the bushing 31, the slurry diffusion member 7, and the aggregate 38 of the short fibers and the powdery resin were raised together with the base 1 to a position at which the distance from the center of the metal bushing 31 in the axial direction to the lower surface of the upper hollow compression mold 4 was 50 mm. At the position, the metal bushing 31 was located at the middle between the upper hollow compression mold 4 and the lower hollow compression mold 2.

As illustrated in FIG. 1D, the base 1 was raised at 1 to 5 mm/s with the bushing 31 located at the middle between the upper hollow compression mold 4 and the lower hollow compression mold 2 until the thickness of the aggregate 38 of the short fibers and the powdery resin was reduced to 20 mm.

Then, the aggregate 38 was compressed in this state for two minutes to obtain a resin rotator molding semifinished product integrated with the metal bushing 31.

Figure 5B:
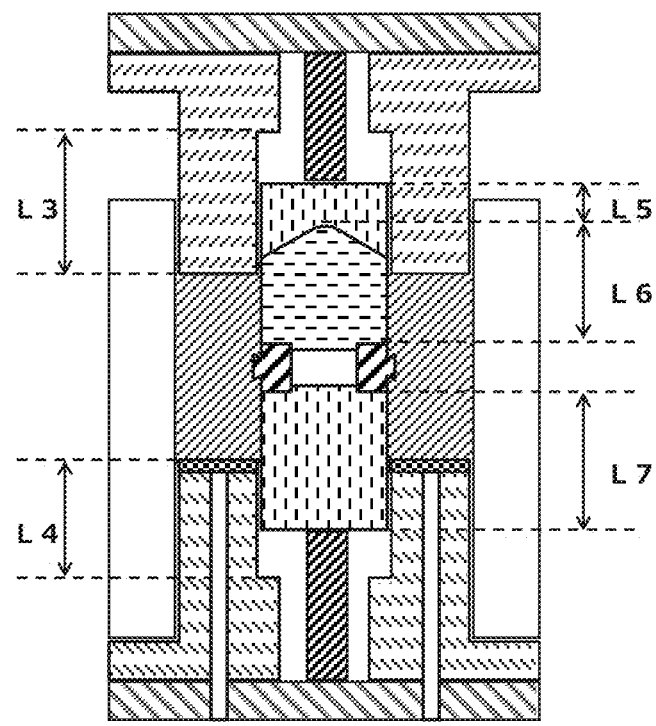
FIG. 5B is a vertical sectional view of the filtration-dehydration-compression apparatus.

During the compression, vacuum suctioning was performed from the discharge ports 12 in the lower hollow compression mold 2. In addition, as illustrated in FIG. 5B, the length L7 of the bushing support member 5 was 100 mm, the length L6 of the slurry diffusion member 7 was 70 mm, the length L5 of the depressing member 8 was 30 mm, the thickness T1 of the metal bushing 31 was 10 mm, and the respective heights L3 and L4 of the stepped portions of the upper hollow compression mold 4 and the lower hollow compression mold 2 were both 100 mm.

Example 2

A molding material was fabricated by the same method as in Example 1 except that the apex of the slurry diffusion member 7 did not have a curved surface shape.

Comparative Example 1

A molding material was fabricated by the same method as in Example 1 except that the short fibers and the powdery resin adhering to and remaining on the slurry diffusion member 7 were not washed away.

After the slurry was poured by the method discussed above in relation to Examples 1 and 2 and Comparative Example 1, the number of times in which the short fibers and the powdery resin remained on the slurry diffusion member 7 (the number of molding materials, out of ten, in which the short fibers and the powdery resin remained on the slurry diffusion member 7) was counted. The counting results are indicated in Table 1 below.

TABLE 1

| Item | Example 1 | Example 2 | Comparative Example 1 |
| --- | --- | --- | --- |
| Number of molding materials with remaining short fibers and powdery resin | 0/10 | 5/10 | 10/10 |

As seen from Table 1, the short fibers and the powdery resin remained on the slurry diffusion member 7 in ten molding materials, out of ten, in Comparative Example 1 in which the short fibers and the powdery resin had not been washed away. Even if cleaning water had been poured, the short fibers and the powdery resin remained on the slurry diffusion member 7 in five molding materials, out of ten, in Example 2 in which the apex of the slurry diffusion member 7 did not have a curved surface shape. In contrast, the short fibers and the powdery resin remained on the slurry diffusion member 7 in no molding materials, out of ten, in Example 1 in which the apex of the slurry diffusion member 7 had a curved surface shape. Therefore, in the present invention, which includes the step of cleaning in which the short fibers and the powdery resin adhering to and remaining on the slurry diffusion member after the step of pouring are washed away, as opposed to Comparative Example 1, the short fibers and the powdery resin do not remain on the slurry diffusion member 7, which involves little fluctuation in amount of short fibers and powdery resin among individual products, and causes no damage to a die to enable continuous production.

In Examples described above, the polymer flocculating agent was added to the slurry to provide high flocculation properties, and thus a sufficient cleaning effect was obtained only in Example 1. However, it has been experimentally verified that a sufficient cleaning effect is obtained if the polymer flocculating agent is not added to the slurry as in the first embodiment, not only when a slurry diffusion portion having a curved surface at a leading portion thereof is used as in the slurry diffusion member used in Example 1 but also when a slurry diffusion portion not having a curved surface at a leading portion thereof is used as in the slurry diffusion member used in Example 2. Thus, it is not necessary that the slurry diffusion member should include a curved surface at a leading portion thereof as in the slurry diffusion member according to Example 1 depending on the viscosity of the slurry etc. Any slurry diffusion portion of the slurry diffusion member can be used in the present invention as long as the slurry diffusion portion at least extends in the upward direction and is shaped such that the area of a transverse section taken along a direction orthogonal to the upward direction becomes smaller as the slurry diffusion portion extends in the upward direction.

INDUSTRIAL APPLICABILITY

According to the present invention, a dispersion medium or water is poured onto the slurry diffusion member to cause the short fibers and the powdery resin adhering to and remaining on the slurry diffusion member to fall down into the cylindrical die. This makes the weight (mass) of the molding material to be manufactured uniform, and prevents substrate entanglement, in which the short fibers and the powdery resin are entangled in a gap between die members, to enable continuous production. This also extends the life of the die.

If the step of discharging in which the dispersion medium is discharged from the cylindrical die and the step of compressing in which the aggregate of the short fibers and the powdery resin is compressed are performed at the same time, the time for one step can be saved, and thus the molding material can be manufactured in a shorter time.

If the dispersion medium is discharged with a reduced atmospheric pressure, the dispersion medium can be discharged in a shorter time.

If the step of compressing in which the aggregate of the short fibers and the powdery resin is compressed is performed with a compressing force of 5 to 25 MPa, a larger amount of the dispersion medium contained in the aggregate of the short fibers and the powdery resin can be discharged. In addition, the bonding strength between the aggregate of the short fibers and the powdery resin and the detent portions provided on the metal bushing is increased, which makes the aggregate of the short fibers and the powdery resin harder and tighter to improve the handleability of the molding material.

If the step of compressing is performed while applying heat, the dispersion medium contained in the aggregate of the short fibers and the powdery resin can be discharged in a short time by keeping the temperature lower than the melting temperature of the powdery resin. If heat is applied with a reduced atmospheric pressure, the dispersion medium can be discharged in a shorter time.

If the aggregate of the short fibers and the powdery resin is shaped like a gear in the cylindrical die, a subsequent cutting step can be simplified when the final product to be fabricated is a gear, which improves the material yield.

In the resin rotator according to the present invention, the weight of the molding material is uniform. Thus, the resin rotator has uniform strength and high durability, and can be used as a resin rotator that can endure high-temperature high-load use conditions in vehicle components, industrial components, and so forth.

DESCRIPTION OF REFERENCE NUMERALS 1 base
2 lower hollow compression mold
3 cylindrical die
4 upper hollow compression mold
5 bushing support member
6 lower elastic member
7 slurry diffusion member
8 depressing member
9 upper elastic member
10 stepped portion
11 stepped portion
12 discharge port
13 filtration-dehydration-compression apparatus
20 slurry injection upper mold
21 slurry injection hole
30 resin gear
31 metal bushing
32 through hole
33 projecting portion
34 recessed portion
35 molding material
36 outer peripheral portion
37 resin molded member
38 aggregate of short fibers and powdery resin
39 bottom member
40 resin rotator molding semifinished product
41 die
42 fixed die
43 movable die
44 upper die
44A pressing portion

The invention claimed is:

1. A method of manufacturing a molding material, comprising the steps of:
preparing slurry by dispersing short fibers and a powdery resin in a dispersion medium:
pouring the slurry into a molding die comprising a cylindrical die and a slurry diffusion member, the cylindrical die having an opening portion opened in an upward direction, the slurry diffusion member being disposed at the center of the cylindrical die to extend in the upward direction and including a slurry diffusion portion shaped such that the area of a transverse section taken along a direction orthogonal to the upward direction becomes smaller as the slurry diffusion portion extends in the upward direction, and the slurry being poured onto the slurry diffusion portion from the upward direction:
cleaning the slurry diffusion portion by pouring a dispersion medium that is the same as the dispersion medium used in the step of preparing or water onto the slurry diffusion portion from above the slurry diffusion portion to cause the short fibers and the powdery resin adhering to the slurry diffusion portion to fall down, after the step of pouring the slurry: and
discharging the dispersion medium or both of the dispersion medium and the water from the molding die to aggregate the short fibers and the powdery resin in the molding die to form an aggregate, wherein:
in the step of pouring and the step of cleaning, the opening portion of the cylindrical die is blocked by a lid member including a nozzle provided at the center to extend downward; and
the length and the distal end shape of the nozzle are determined such that the dispersion medium or the water is poured onto the slurry diffusion portion in the step of cleaning.

2. The method of manufacturing a molding material according to claim 1, further comprising the step of:
compressing the aggregate to form a molding material, during or after the step of discharging.

3. The method of manufacturing a molding material according to claim 1, wherein:
the step of preparing includes adding at least one type of polymer flocculating agent capable of causing flocculation due to electrostatic attraction to a mixed solution obtained by mixing the short fibers, the powdery resin, and water; and
the slurry diffusion portion of the slurry diffusion member has a curved surface convexed upwardly at a leading portion thereof.

4. The method of manufacturing a molding material according to claim 3, wherein:
the polymer flocculating agent capable of causing flocculation due to electrostatic attraction comprises a cationic polymer flocculating agent and an anionic polymer flocculating agent; and
the cationic polymer flocculating agent is added and the anionic polymer flocculating agent is subsequently added to the mixed solution.

5. The method of manufacturing a molding material according to claim 3, wherein an amphoteric polymer flocculating agent is added to the mixed solution as the at least one type of polymer flocculating agent capable of causing flocculation due to electrostatic attraction.

6. The method of manufacturing a molding material according to claim 4, wherein
the cationic polymer flocculating agent is a cationic styrene-based polymer aqueous solution, and the anionic polymer flocculating agent is an anionic acrylic-based polymer aqueous solution.

7. The method of manufacturing a molding material according to claim 1, wherein
in the step of cleaning, pouring of a predetermined amount of the dispersion medium or the water is performed a plurality of times at a predetermined interval.

8. The method of manufacturing a molding material according to claim 7, wherein
the predetermined interval is defined as a time required until a liquid surface of the dispersion medium or the water becomes lower than an upper surface of a layer of the short fibers and the powdery resin which have already fallen down.

9. The method of manufacturing a molding material according to claim 1, wherein
the step of discharging is performed with a reduced atmospheric pressure inside a discharge port.

10. The method of manufacturing a molding material according to claim 2, wherein
the step of compressing is performed with a compressing force of 5 to 25 MPa.

11. The method of manufacturing a molding material according to claim 2, wherein
the step of compressing is performed while applying heat at a temperature lower than the melting temperature of the powdery resin.

12. A method of manufacturing a resin rotator, comprising the steps of:
applying pressure to the molding material manufactured according to the method of claim 1 while heating the molding material, thereby melting the powdery resin to generate a molten resin;
impregnating a reinforcing fiber layer formed from the short fibers with the molten resin;
subsequently curing the molten resin; and
forming a resin molded member for the resin rotator.

13. The method of manufacturing a resin rotator according to claim 12, further comprising the step of:
forming teeth on an outer peripheral portion of the resin molded member, after the step of forming the resin molded member.

* * * * *